United States Patent
Park

(10) Patent No.: US 7,219,839 B2
(45) Date of Patent: May 22, 2007

(54) METHOD FOR ENHANCING TRANSFER RATE OF MULTIMEDIA CARD USING DIFFERENTIAL SIGNAL

(75) Inventor: Hyoung-jun Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 179 days.

(21) Appl. No.: 10/889,181

(22) Filed: Jul. 13, 2004

(65) Prior Publication Data

US 2005/0045722 A1    Mar. 3, 2005

(30) Foreign Application Priority Data

Aug. 29, 2003   (KR)  ............... 10-2003-0060256

(51) Int. Cl.
    *G06K 7/06* (2006.01)
(52) U.S. Cl. ..................... 235/441; 235/492
(58) Field of Classification Search ........... 235/492, 235/375; 710/104
    See application file for complete search history.

(56) References Cited

U.S. PATENT DOCUMENTS

| | | | |
|---|---|---|---|
| 6,182,162 B1 | 1/2001 | Estakhri et al. | |
| 6,973,519 B1 * | 12/2005 | Estakhri et al. | 710/104 |
| 2001/0000405 A1 * | 4/2001 | Gray et al. | 235/375 |
| 2001/0009505 A1 | 7/2001 | Nishizawa et al. | |
| 2003/0090953 A1 | 5/2003 | Kawai et al. | |
| 2003/0206547 A1 * | 11/2003 | Cho | 370/364 |
| 2004/0084538 A1 * | 5/2004 | Nishizawa et al. | 235/492 |

FOREIGN PATENT DOCUMENTS

| | | |
|---|---|---|
| JP | 9-160692 A | 6/1997 |
| JP | 2001-307025 A | 11/2001 |
| JP | 2002-525720 | 8/2002 |
| KR | 2001-0037219 A | 5/2001 |
| KR | 2003-0033029 A | 4/2003 |
| WO | WO 00/16255 | 3/2000 |
| WO | WO 02/31762 | 4/2002 |

OTHER PUBLICATIONS

MXIC, MX53L00201 ROM MultiMediaCard, Apr. 10, 2003, Macronix, pp. 5,7,14,20, http://www.macronix.com/QuickPlace/hq/PageLibrary48256F6C002B05A5.nsf/h_19EC3B1F7E913EE248256F6C002B1E62/EBC45A3011B58F7B48256F6C002C6C7E/$File/MX53L00201-1.7.pdf?OpenElement.*
European Search Report.

* cited by examiner

Primary Examiner—Michael G. Lee
Assistant Examiner—Kristy A. Haupt
(74) Attorney, Agent, or Firm—Sughrue Mion, PLLC

(57) ABSTRACT

Provided is a method and apparatus for enhancing a data transfer rate by adding a new data transfer channel using a differential signal to a conventional MMC. The method includes steps of determining whether a host controller is a host controller for a high-speed multimedia card; determining whether a multimedia card is a high-speed multimedia card; transferring data using a VDAT channel if the host controller is a host controller for a high-speed multimedia card and the multimedia card is a high-speed multimedia card; and transferring the data using a DAT channel in the other cases. A host controller for controlling a multimedia card configures a VDAT channel capable of transferring a differential signal using a reserved terminal of a conventional multimedia card and a newly added terminal, and includes a data channel selection unit for using the configured channel.

15 Claims, 7 Drawing Sheets

METHOD FOR ENHANCING TRANSFER RATE OF MULTIMEDIA CARD USING DIFFERENTIAL SIGNAL

BACKGROUND OF THE INVENTION

This application claims the priority of Korean Patent Application No. 10-2003-0060256 filed on Aug. 29, 2003, in the Korean Intellectual Property Office, the disclosure of which is incorporated herein in its entirety by reference.

1. Field of Invention

The present invention relates to an apparatus for enhancing a data transfer rate of a multimedia card (MMC), and more particularly, to a method and apparatus for enhancing a data transfer rate by adding a new data transfer channel using a differential signal to a conventional MMC.

2. Description of the Related Art

There have been marketed various types of small-sized terminals conforming to a tendency for all products to be miniaturized with the development of very large scale integrated circuits (VLSIs) and computing techniques. The terminals mentioned herein refer to personal digital assistants (PDAs) and hand held personal computers (HPCs). Accordingly, interface systems that can be connected to such terminals have also gradually decreased in size due to the small sizes of the terminals. In accordance with this tendency, various types of small cards are being developed. Typical of these cards is a multimedia card (hereinafter, simply referred to as "MMC"). First, the MMC will be discussed briefly. Siemens AG and SanDisk Corporation began to develop a new data storage medium called MMC in May of 1997. The MMC is characterized by a small-sized data storage medium, high capacity, applicability to a portable terminal and the like, and efficient use of a battery and an inexpensive and simple interface for a portable terminal.

FIG. 1 is a block diagram showing external appearances and respective terminals of a conventional multimedia card and socket.

A MMC 100 is a memory card having an arrangement of seven terminals: a DAT terminal 16, a CLK terminal 14, a CMD terminal 11, a $V_{DD}$ terminal 13, a $V_{SS}$ terminal 12, a $V_{SS2}$ terminal 15, and a reserved terminal 10. Further, a MMC socket 110 has a terminal arrangement corresponding to that of the MMC 100.

The DAT terminal 16 is a terminal for transferring a single-ended signal for data, and the CLK terminal 14 is a terminal for receiving a clock (hereinafter, referred to as "MCLK") for the operation of the MMC from a host controller (120 in FIG. 2). The CMD terminal 11 is a terminal for receiving control commands from the host controller. The control commands include, for example, commands related to control of the MMC, such as data read and data write commands. The $V_{DD}$ terminal 13 is a terminal for applying a DC voltage, and the $V_{SS}$ terminal 12 and the $V_{SS2}$ terminal 15 are terminals serving as grounds for the DC voltage. The reserved terminal 10 is a reserved terminal prepared such that a user can separately define and use the reserved terminal.

FIG. 2 is a block diagram showing a configuration for transmitting/receiving data between conventional multimedia cards and a host controller.

The host controller 120 is a controller for the MMCs, which recognizes n MMCs 100 and manages control command transfer, data transfer, and the like.

When the host controller 120 sends a relevant command to a MMC 100 via a CMD line 2, the MMC 100 that has received the command sends a relevant response via the CMD line 2. After the relevant control process mentioned above has been performed via the CMD line 2, relevant data are transmitted and received between the host controller 120 and the MMC 100 via a DAT line 7.

That is, the DAT line 7 is used when the conventional MMC 100 transmits and receives data to and from the host 120. At this time, the data are transferred by means of a single-ended signal, i.e. a signal sent in a serial manner via a single line. Since the transfer rate of such a case is theoretically limited to several tens of Mbps (the current limit of the transfer rate is about 50 Mbps), it is difficult to use a conventional MMC for high-speed transfer greater than 100 Mbps.

SUMMARY OF THE INVENTION

The present invention is conceived to solve the aforementioned problem. An object of the present invention is to provide a method for implementing a high transfer rate by supplementing the problem caused by using a single-ended signal in a conventional multimedia card.

Another object of the present invention is to increase a data transfer rate up to several hundreds of Mbps or more by adding a data channel using a differential signal with low voltage in addition to an existing data channel.

A further object of the present invention is to maintain comparability with a conventional MMC even while implementing the present invention.

According to an aspect of the present invention for achieving the objects, there is provided a method for enhancing a transfer rate of a multimedia card using a differential signal upon transmission and reception of data between the multimedia card and a host controller for controlling the multimedia card, comprising a first step of determining whether the host controller is a host controller for a high-speed multimedia card; a second step of determining whether the multimedia card is a high-speed multimedia card; a third step of transferring the data using a VDAT channel if the host controller is a host controller for a high-speed multimedia card and the multimedia card is a high-speed multimedia card; and a fourth step of transferring the data using a DAT channel in the other cases.

According to another aspect of the present invention, there is provided a host controller for controlling a multimedia card in a system including the multimedia card and the host controller to transmit and receive data therebetween, wherein the multimedia card configures a VDAT channel capable of transferring a differential signal using a reserved terminal of a conventional multimedia card and a newly added terminal, and the host controller comprises a data channel selection unit for using the configured channel.

According to a further aspect of the present invention, there is provided a multimedia card in a system including the multimedia card and a host controller for controlling the multimedia card to transmit and receive data therebetween, wherein the multimedia card configures a VDAT channel capable of transferring a differential signal using a reserved terminal of a conventional multimedia card and a newly added terminal, and the host controller comprises a data channel selection unit for using the configured channel.

BRIEF DESCRIPTION OF THE DRAWINGS

The above and other objects and features of the present invention will become apparent from the following description of exemplary embodiments given in conjunction with the accompanying drawings, in which.

DETAILED DESCRIPTION OF THE ILLUSTRATIVE, NON-LIMITING EMBODIMENTS OF THE INVENTION

Hereinafter, exemplary embodiments of the present invention will be described in detail with reference to the accompanying drawings.

Figure 3:
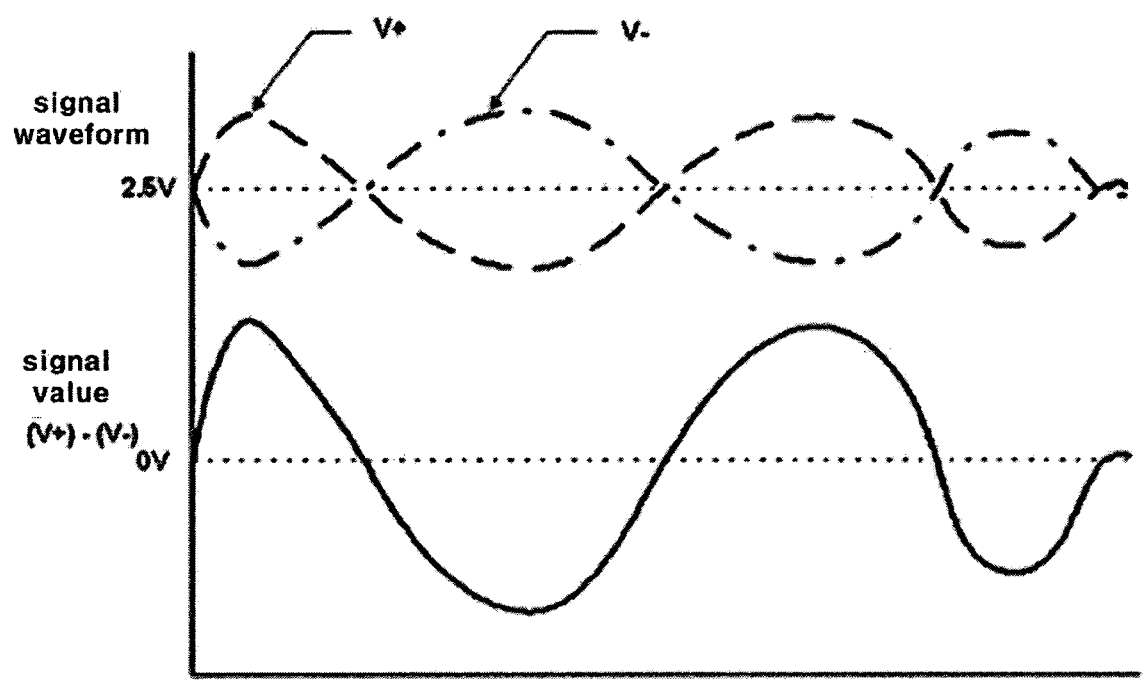
FIG. 3 illustrates the waveform of a differential signal and a single-ended equivalent signal corresponding thereto.

FIG. 3 illustrates the waveform of a differential signal and a single-ended equivalent signal corresponding thereto. V+ and V− electrically fluctuate like a seesaw, wherein it is defined as positive if V+ is greater than V−, while it is defined as negative if V+ is smaller than V−. As shown in FIG. 3, when the difference between V+ and V− in the signal waveform is calculated and the signal value of a single-ended signal equivalent to the difference is obtained, the signal value maximally ranges from 0V to 5V. Thus, with the use of the differential signal, it is possible to easily identify a weak signal by adjusting a reference voltage. Further, it becomes less sensitive to external electromagnetic interference, thereby enhancing reliability of signal recognition.

A typical example for enhancing a transfer rate using the differential signal described above is a universal serial bus (USB). USB is superior to a conventional serial bus in view of its transfer rate.

Figure 4:
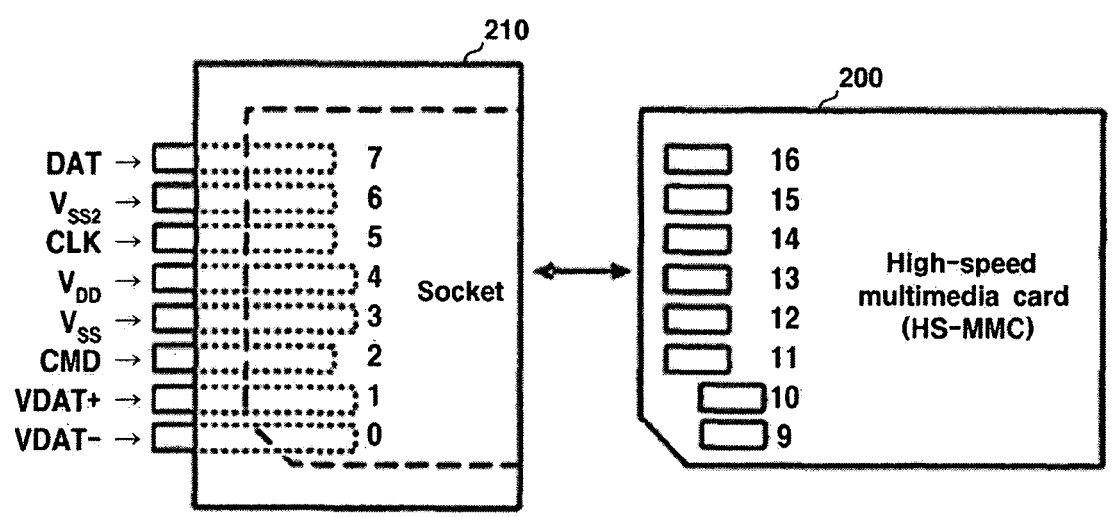
FIG. 4 is a block diagram showing external appearances and respective terminals of a HS-MMC and a socket for the HS-MMC, which are implemented using a differential signal, according to an embodiment of the present invention.

FIG. 4 is a block diagram showing external appearances and respective terminals of a HS-MMC and a socket for the HS-MMC, which are implemented using a differential signal, according to an embodiment of the present invention. The embodiment of the present invention has the following configuration.

Figure 1:
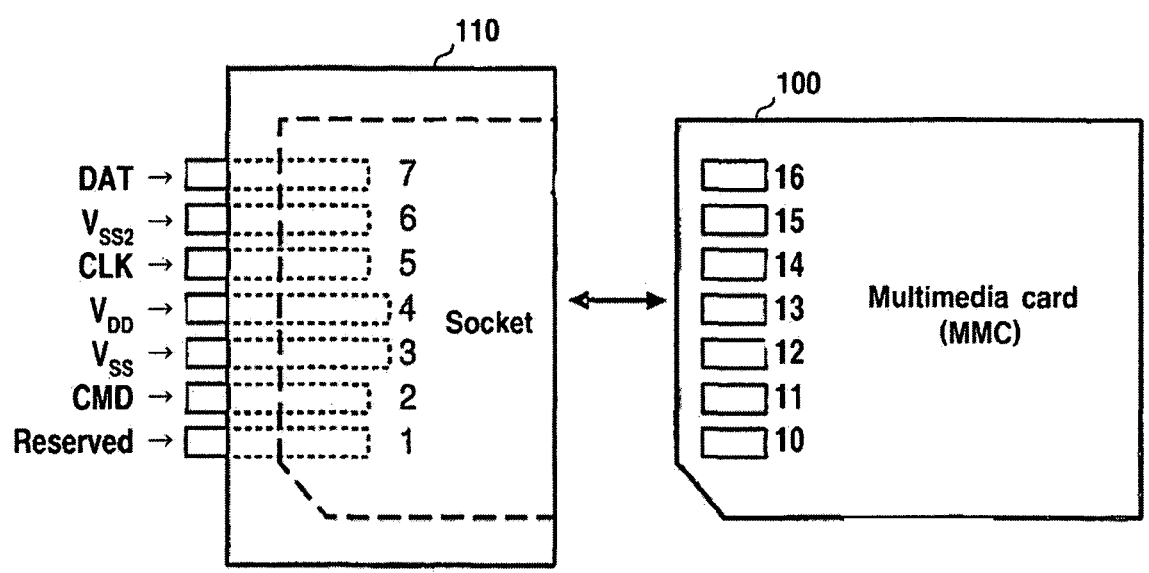
FIG. 1 is a block diagram showing external appearances and respective terminals of a conventional multimedia card and socket.
Figure 2:
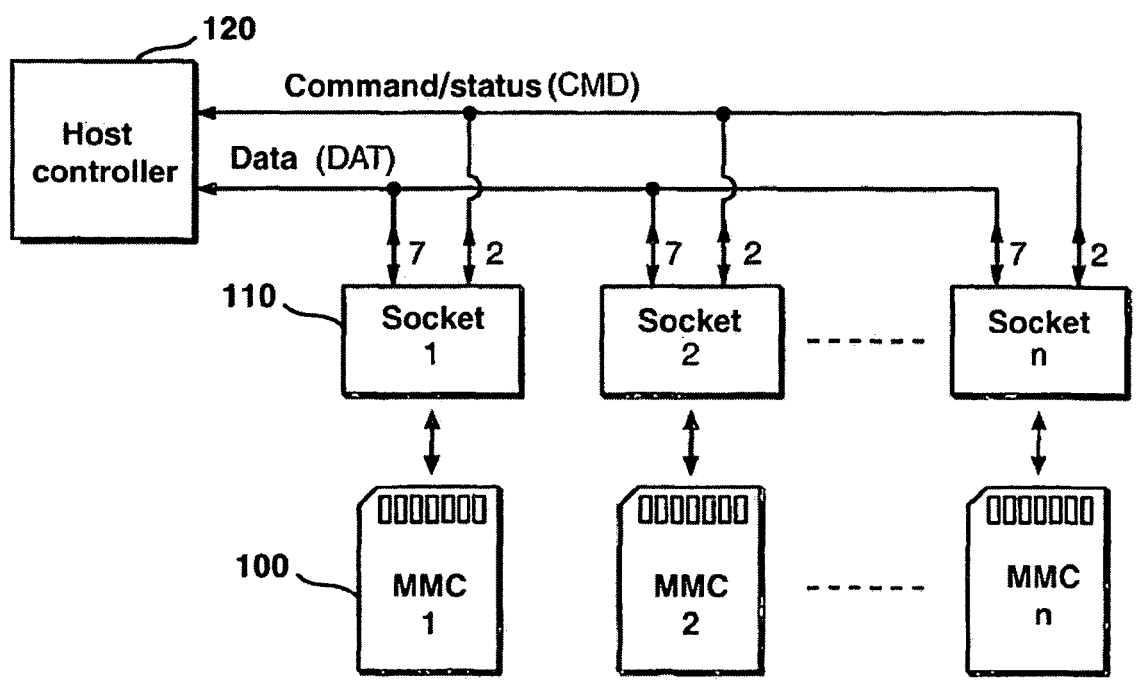
FIG. 2 is a block diagram showing a configuration for transmitting/receiving data between conventional multimedia cards and a host controller.

A configuration of terminals for a high-speed MMC (hereinafter, referred to as "HS-MMC") 200 will be first explained. The HS-MMC uses the terminal 10, which is reserved in the conventional MMC card (100 in FIG. 1), and a newly added terminal 9. A new data bus channel (hereinafter, referred to as "VDAT channel") using a differential signal between the VDAT+ terminal 10 and the VDAT− terminal 9 is configured with the terminal 10 and the newly added terminal 9.

Next, as for the configuration of a socket 210 for the HS-MMC, it is configured by employing a reserved terminal 1 and adding a new terminal 0 in order to connect the VDAT+ terminal 10 and the VDAT− terminal 9, which are modified and added in the HS-MMC, to each other.

Figure 5:
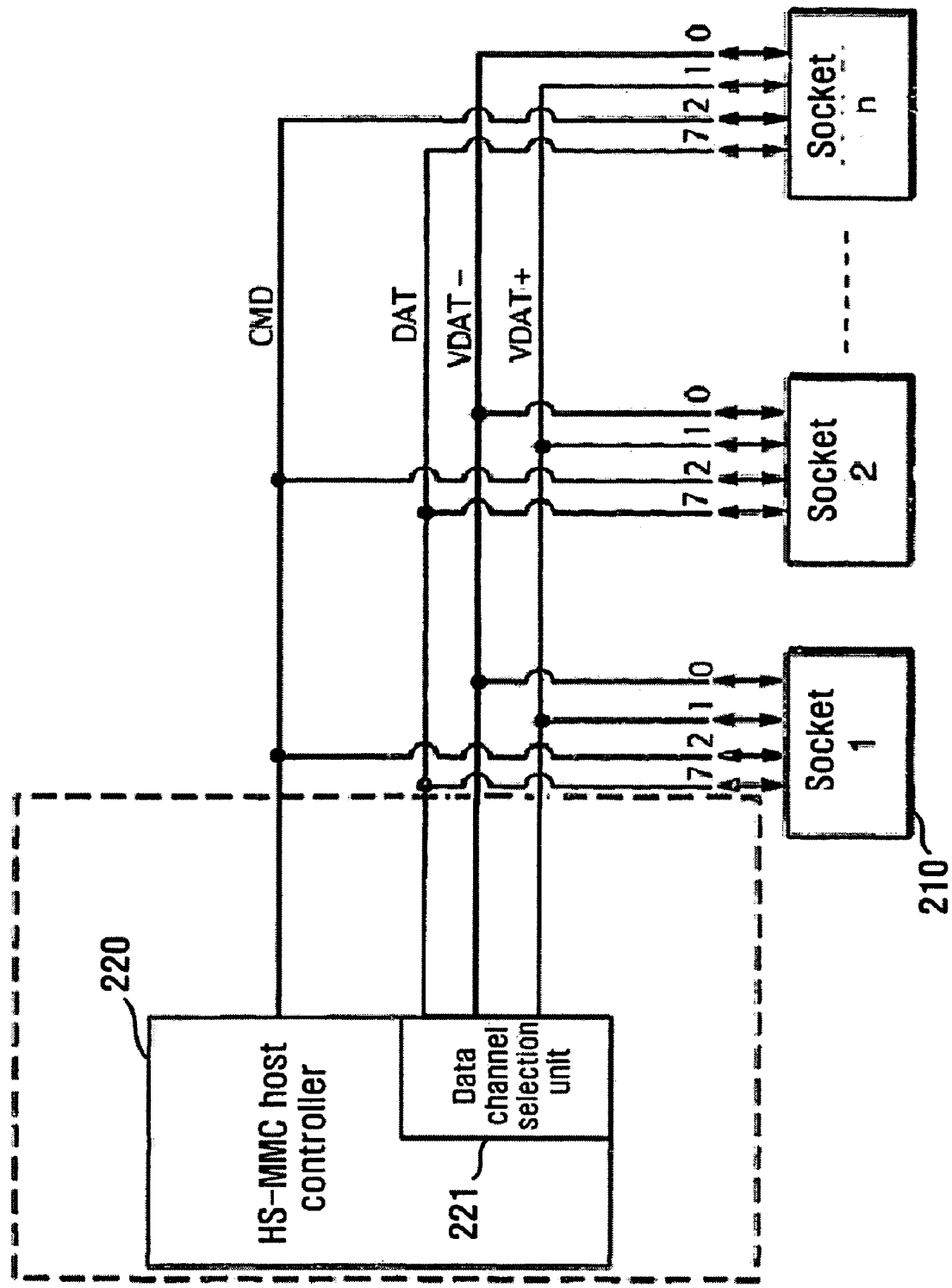
FIG. 5 is a block diagram illustrating a configuration for transmitting/receiving data between the HS-MMC and a HS-MMC host controller according to an embodiment of the present invention.

FIG. 5 is a block diagram illustrating a configuration for transmitting/receiving data between the HS-MMC and a HS-MMC host controller the according to an embodiment of the present invention.

A data channel selection unit 221 is added to the HS-MMC host controller 220 so as to use the data bus channel that is configured through the VDAT+ terminal 1 and the VDAT− terminal 0 newly added as compared with the conventional host controller 120. The channel selection unit 221 is connected to the DAT terminal 7, the VDAT+ terminal 1 and the VDAT− terminal 0 of each of sockets 210 that accommodate HS-MMCs. In FIG. 5, although not shown, the CLK terminal 5 is also connected to the channel selection unit 221 and the sockets 210. Further, illustration of other $V_{DD}$, $V_{SS}$ and $V_{SS2}$ terminals 4, 3 and 6 is omitted since they are general terminals used for DC voltage supply or ground.

Figure 6:
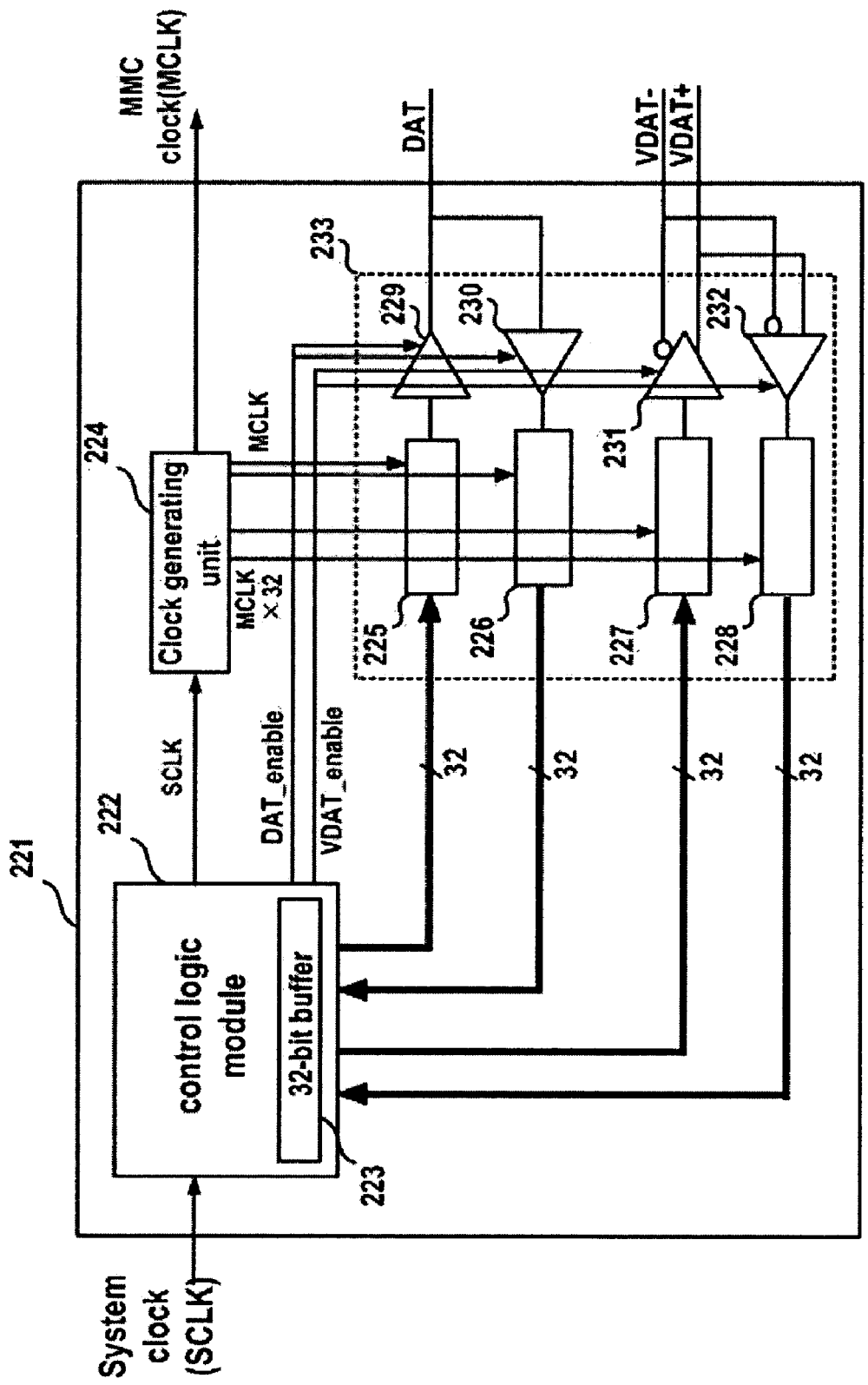
FIG. 6 is a block diagram illustrating the internal configuration of a data channel selection unit present in the HS-MMC host controller.

FIG. 6 is a block diagram illustrating the internal configuration of the data channel selection unit present in the HS-MMC host controller.

If the MMC (200 in FIG. 4) is inserted into the socket (210 in FIG. 4), the host controller 220 initializes the inserted MMC 200 and determines a data channel to communicate with the MMC while calling the status of the MMC 200. Here, when one of the DAT channels (7 in FIG. 4) and the VDAT channels (1 and 0 in FIG. 4) is determined, a control logic module 222 activates one of a DAT_enable signal and a VDAT_enable signal. Then, one of the DAT line 7 and the VDAT+/− lines 1 and 0 is activated physically.

Further, a data transmitting/receiving unit 233 may comprise a first serializer 225, a first deserializer 226, a second serializer 227, a second deserializer 228, a first driver 229, a first receiver 230, a second driver 231 and a second receiver 232. The respective components will be described below at relevant portions.

Meanwhile, a system clock (SCLK) received from the host controller 220 is transferred to a clock generating unit 224 via the control logic module 222. The clock generating unit 224 generates a clock, i.e. MCLK to be used in the MMC, using the transferred SCLK, and transmits the MCLK to the MMC 200 via the CLK line 5. Further, the clock logic module 222 supplies the MCLK to the first serializer 225 and the first deserializer 226, and supplies a clock having a size of MCLK multiplied by 32 to the second serializer 227 and the second deserializer 228.

Considering an output upon activation of the DAT channel 7, data in a 32-bit buffer 223 of the control logic module 222 are synchronized with the MCLK via the first serializer 225 and the first driver 229 and are then transferred to the MMC. Meanwhile, as for an input, received 1-bit serial data are synchronized with the MCLK via the first receiver 230 and the first deserializer 226. Then, accumulated 32-bit data are transferred to the buffer 223 whenever the MCLK becomes 32 clocks.

Considering an output upon activation of the VDAT channels 1 and 0, data in the 32-bit buffer 223 of the control logic module 222 are synchronized with MCLK×32 via the second serializer 227 and the second driver 231 and are then transferred to the MMC. Meanwhile, as for an input, the received 1-bit serial data are synchronized with the MCLK×32 via the second receiver 232 and the second deserializer 228. Then, accumulated 32-bit data are transferred to the buffer 223 whenever the MCLK becomes one clock.

Accordingly, in both cases of the output from the HS-MMC host controller 220 to the HS-MMC 200 and the input from the HS-MMC 200 to the HS-MMC host controller 220, the VDAT channels 1 and 0 can send data that are 32 times as large as data through the DAT channel 7 on the basis of the same MCLK.

Although the data transfer rate can be improved by 32 times due to the 32 bits of the buffer, the 32 bits are merely illustrative and another number of bits can be freely used within a range that can be accepted by the MMC 200. Thus, although the existing DAT channel 7 using the single-ended signal is not affected by the increase in the number of bits of the buffer 223, the rate of the VDAT channels 1 and 0 using two lines increases by the number of bits of the buffer 223.

The HS-MMC 200 and the HS-MMC host controller 220 according to the present invention are not necessarily connected to each other to perform their operations. The present invention provides comparability in such a manner that the HS-MMC 200 can operate through connection to the conventional MMC host controller 120 or the conventional MMC 100 can operate through connection to the HS-MMC host controller 220.

In this regard, the present invention can operate in different manners under the following four situations.

The first case is a case where a host is the HS-MMC host controller 220 and a card is also the HS-MMC 200. When the card 200 is first inserted into the socket 210, the host controller 220 sends CMD9 to the card 200 to request card specific data (hereinafter, referred to as "CSD"). At this time, information indicating the HS-MMC host controller 220 is carried on [15:0] stuff bits of arguments in the CMD9 and then sent to the card. The structure and use of the CMD9 are defined in MMC standard specifications.

The card 200 that has received the CMD9 recognizes the host controller 220 as a HS-MMC host controller. Further, the card 200 sends the contents of a CSD register to the host controller 220, wherein information indicating the HS-MMC 200 is set in reserved bits of the CSD register and then sent to the host controller. Then, the host controller 220 that has received the contents recognizes the card 200 as a HS-MMC and transfers data via the VDAT+ data channel 1 and the VDAT− data channel 0 at a higher transfer rate.

The second case is a case where a host is the HS-MMC host controller 220 and a card is the conventional MMC 100. When the card 100 is inserted into the socket 210, the host controller 220 sends CMD9 to the card 100 to request CSD. At this time, the information indicating the HS-MMC host is carried on the [15:0] stuff bits of the arguments in the CMD9 and then sent to the card. However, the card 100 that has received the CMD9 ignores this information since the card itself is a MMC, and recognizes the host 220 as a MMC host. Further, the card 100 sends the contents of a CSD register to the host controller 220. At this time, since worthless information (trash value) is carried on the reserved bits of the CSD register, the host controller 220 that has read the information recognizes the card 100 as a MMC and transfers data via the DAT data channel 7.

The third case is a case where a host is the conventional MMC host controller 120 and a card is the HS-MMC 200. If the card 200 is inserted into the socket 210, the host controller 120 sends CMD9 to the card 200 to request CSD. The card 200 that has received the CMD9 recognizes the host controller 120 as a MMC host controller since there is no information indicating the HS-MMC host in the [15:0] stuff bits of the arguments in the CMD9. Further, the card 200 sends the contents of the CSD register to the host controller 120. At this time, although information indicating the HS-MMC 200 is set in the reserved bits of the CSD register and then sent to the host controller, the host controller 120 that has read the information ignores it and recognizes the card 200 as a MMC since the host controller is a MMC host controller. Accordingly, data are sent via the DAT data channel 7.

The fourth case is a case where a host is the conventional MMC host controller 120 and the card is also the MMC 200. When the card 100 is inserted into the socket 210, the host controller 120 sends CMD9 to the card 100 to request CSD. The card 100 that has received the CMD9 recognizes the host controller 120 as a MMC host controller. Further, the card 100 sends the contents of the CSD register to the host controller 120. Then, the host controller 120 that has read the contents recognizes the card 100 as a MMC and sends data via the DAT data channel 7.

Figure 7:
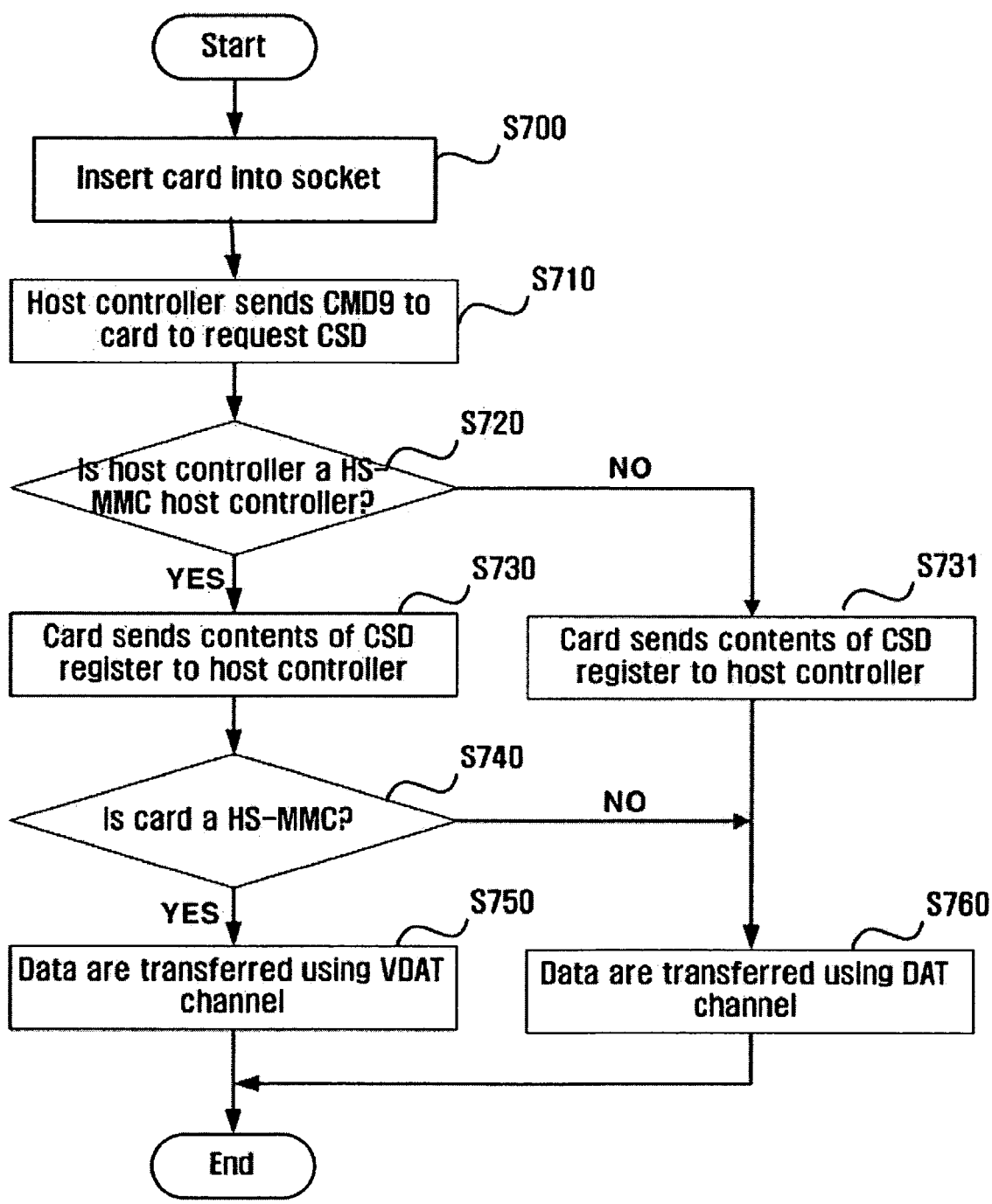
FIG. 7 is a flowchart illustrating an entire operation according to an embodiment of the present invention.

FIG. 7 is a flowchart illustrating an entire operation according to the present invention.

First, when a user inserts a card into a socket (S700), a host controller sends CMD9 to the card to request CSD (S710). If there is information indicating the host controller in [15:0] stuff bits of arguments in the CMD9, it informs that the host controller is a HS-MMC host controller. On the contrary, if there is no information indicating the host controller therein, it informs that the host controller is a conventional MMC host controller. If the host controller is not a HS-MMC host controller (S720), the host controller receives the contents of a CSD register from the card (S731) and transfers data via a general DAT channel (S760). However, if the host controller is a HS-MMC host controller (S720), the host controller receives the contents of the CSD register from the card (S730) and determines whether information indicating a HS-MMC has been set in reserved bits of the CSD register, i.e. whether the card is a HS-MMC (S740). If the card is a HS-MMC, data are transferred via a VDAT channel (S750), whereas if the card is a conventional MMC, data are sent via the general DAT channel (S760).

Since the process of transferring data using the VDAT channel or the general DAT channel has been described with reference to FIGS. 5 and 6, iterative description thereof will be omitted.

According the present invention, it is possible to enhance the transfer rate of the MMC theoretically up to about 500 Mbps by adding a new data transfer channel using a differential signal with low voltage.

Moreover, according to the present invention, it is possible to maintain comparability with a conventional MMC by adding a new data channel while maintaining the existing data channel of the conventional MMC as it is.

Although the embodiments of the present invention have been described with reference to the accompanying drawings, it can be understood by those skilled in the art that the present invention can be implemented in the other specific forms without modifying or changing the technical spirit and essential features thereof. Therefore, it should be understood that the aforementioned embodiments are not limitative but illustrative in all aspects. The scope of the present invention should be defined by the appended claims, and all changes or modifications made from the spirit and scope of the invention and equivalents thereof should be construed as falling within the scope of the invention.

What is claimed is:

1. A method for enhancing a transfer rate of a multimedia card using a differential signal upon transmission and reception of data between the multimedia card and a host controller for controlling the multimedia card, comprising:

a first step of determining whether the host controller is a host controller for a high-speed multimedia card;

a second step of determining whether the multimedia card is a high-speed multimedia card;

a third step of transferring the data using a new data bus (VDAT) channel if the host controller is a host controller for a high-speed multimedia card and the multimedia card is a high-speed multimedia card; and a fourth step of transferring the data using a data bus (DAT) channel if the host controller is not the host controller for the high-speed multimedia card, or if the multimedia card is not the high-speed multimedia card;

wherein the high-speed multimedia card configures the VDAT channel capable of transferring the differential signal using a reserved terminal of a conventional multimedia card and a newly added terminal.

2. The method as claimed in claim 1, wherein the channel selection unit comprises:

a control logic module for receiving a system clock received from the host controller, transmitting the system clock to a clock generating unit, and activating one of a DAT_enable signal and a VDAT_enable signal;

the clock generating unit for generating a multimedia card (MMC) clock using the system clock received from the control logic module, transmitting the MMC clock to the multimedia card, and supplying the MMC clock to a data transmitting/receiving unit in a DAT_enable state, or a clock obtained by multiplying the MMC clock by a predetermined multiple number to the data transmitting/receiving unit in a VDAT_enable state; and the data transmitting/receiving unit for transmitting/receiving data present in a buffer of the control logic module via the DAT channel or the VDAT channel by synchronizing the data with the clock received from the clock generating unit.

3. The method as claimed in claim 1, wherein the first step comprises a step of making a determination through a mode command (CMD9) that the host controller sends to the multimedia card a request for card specific data (CSD).

4. The method as claimed in claim 3, wherein the step of making the determination through the CMD9 is performed based on whether information indicating the host controller for the high-speed multimedia card exists in [15:0] stuff bits of arguments in the CMD9.

5. The method as claimed in claim 1, wherein the second step comprises a step of making determination through the contents of a CSD register that the multimedia card sends in response to a request received from the host controller.

6. The method as claimed in claim 5, wherein the step of making the determination through the contents of the CSD register is performed based on whether information indicating the high-speed multimedia card exists in reserved bits of the CSD register.

7. A method for enhancing a transfer rate of a multimedia card using a differential signal upon transmission and reception of data between the multimedia card and a host controller for controlling the multimedia card, comprising:

a first step of determining whether the host controller is a host controller for a high-speed multimedia card;

a second step of determining whether the multimedia card is a high-speed multimedia card;

a third step of transferring the data using a new data bus (VDAT) channel if the host controller is a host controller for a high-speed multimedia card and the multimedia card is a high-speed multimedia card; and a fourth step of transferring the data using a data bus (DAT) channel if the host controller is not the host controller for the high-speed multimedia card, or if the multimedia card is not the high-speed multimedia card;

wherein the host controller for a high-speed multimedia card configures the VDAT channel capable of transferring the differential signal using a reserved terminal of a conventional multimedia card and a newly added terminal, and comprises a data channel selection unit for using the configured channel.

8. A host controller for controlling a multimedia card in a system including the multimedia card and the host controller to transmit and receive data therebetween, wherein:

the multimedia card configures a VDAT channel capable of transferring a differential signal using a reserved terminal of a conventional multimedia card and a newly added terminal, and the host controller comprises a data channel selection unit for using the configured channel.

9. The host controller as claimed in claim 8, wherein the channel selection unit comprises:

a control logic module for receiving a system clock received from the host controller, transmitting the system clock to a clock generating unit, and activating one of a DAT_enable signal and a VDAT_enable signal;

the clock generating unit for generating a MMC clock using the system clock received from the control logic module, transmitting the MMC clock to the multimedia card, and supplying the MMC clock to a data transmitting/receiving unit in a DAT_enable state, or a clock obtained by multiplying the MMC clock by a predetermined multiple number to the data transmitting/receiving unit in a VDAT_enable state; and the data transmitting/receiving unit for transmitting/receiving data present in a buffer of the control logic module via the DAT channel or the VDAT channel by synchronizing the data with the clock received from the clock generating unit.

10. The host controller as claimed in claim 8, wherein the host controller sends CMD9 to the multimedia card to request card specific data, and the CMD9 includes information indicating a host controller for a high-speed multimedia card in [15:0] stuff bits of arguments in the CMD9.

11. The host controller as claimed in claim 8, wherein the multimedia card sends the contents of a CSD register in response to a request from the host controller, and information indicating a high-speed multimedia card is included in reserved bits of the CSD register.

12. The multimedia card as claimed in claim 11, wherein the multimedia card sends the contents of a CSD register in response to a request from the host controller, and information indicating a high-speed multimedia card is included in reserved bits of the CSD register.

13. A multimedia card in a system including the multimedia card and a host controller for controlling the multimedia card to transmit and receive data therebetween, wherein:

the multimedia card configures a new data bus (VDAT) channel capable of transferring a differential signal using a reserved terminal of a conventional multimedia card and a newly added terminal, and the host controller comprises a data channel selection unit for using the configured channel.

14. The multimedia card as claimed in claim 13, wherein the channel selection unit comprises:

a control logic module for receiving a system clock received from the host controller, transmitting the system clock to a clock generating unit, and activating one of a data bus (DAT)_enable signal and a VDAT_enable signal;

the clock generating unit for generating a multimedia (MMC) clock using the system clock received from the control logic module, transmitting the MMC clock to the multimedia card, and supplying the MMC clock to a data transmitting/receiving unit in a DAT_enable state, or a clock obtained by multiplying the MMC clock by a predetermined multiple number to the data transmitting/receiving unit in a VDAT_enable state; and the data transmitting/receiving unit for transmitting/receiving data present in a buffer of the control logic module via the DAT channel or the VDAT channel by synchronizing the data with the clock received from the clock generating unit.

15. The multimedia card as claimed in claim 13, wherein the host controller sends a mode command (CMD9) to the multimedia card to request card specific data (CSD), and the CMD9 includes information indicating a host controller for a high-speed multimedia card in [15:0] stuff bits of arguments in the CMD9.

* * * * *